United States Patent
Staples et al.

(10) Patent No.: US 7,098,918 B2
(45) Date of Patent: Aug. 29, 2006

(54) SYSTEM AND METHOD FOR SHAPE PRESERVATION OF CURVES IN AN EDITING PROCESS

(75) Inventors: Daniel C. Staples, Madison, AL (US); Navinchandra Pai, Madison, AL (US); Yong-Ming Li, Madison, AL (US); Joseph J. Bohman, Cypress, CA (US); Kristopher C. Kasprzak, Madison, AL (US); Aditya N. Gurushankar, Huntsville, AL (US); Prasad Pingali, Madison, AL (US)

(73) Assignee: UGS Corp., Plano, TX (US)

( * ) Notice: Subject to any disclaimer, the term of this patent is extended or adjusted under 35 U.S.C. 154(b) by 183 days.

(21) Appl. No.: 10/382,083

(22) Filed: Mar. 5, 2003

(65) Prior Publication Data

US 2004/0174363 A1    Sep. 9, 2004

(51) Int. Cl.
*G00T 11/20* (2006.01)
(52) U.S. Cl. .................................... 345/442
(58) Field of Classification Search ................ 345/442
See application file for complete search history.

(56) References Cited

U.S. PATENT DOCUMENTS

| | | | |
|---|---|---|---|
| 5,412,770 A | 5/1995 | Yamashita et al. | |
| 5,731,819 A * | 3/1998 | Gagne et al. | 345/647 |
| 5,754,181 A | 5/1998 | Amdursky et al. | |
| 5,757,678 A | 5/1998 | Leeke | |
| 5,894,310 A | 4/1999 | Arsenault et al. | |
| 5,940,083 A | 8/1999 | Broekhuijsen | |
| 6,271,856 B1 * | 8/2001 | Krishnamurthy | 345/581 |
| 2003/0025697 A1 | 2/2003 | Gupta | |

FOREIGN PATENT DOCUMENTS

EP    0 551 543 A1    7/1993

OTHER PUBLICATIONS

Patton, DFB. "Flash 5! Creative Web Animation". Pub Date: Dec. 22, 2000.*

* cited by examiner

*Primary Examiner*—Ryan Yang

(57) ABSTRACT

A system, method, and computer program product which allows more versatile manual and automatic edits by embedding behaviors in the curve elements. These imbedded behaviors allow intelligent shape preservation during a curve edit. Each curve carries a behavior property that describes how it should react when edited. This means that the curve and graphics system have full knowledge of the right edit type to make, even when triggered by an outside source, such as a re-compute of an object at a higher level in the feature tree.

21 Claims, 3 Drawing Sheets

SYSTEM AND METHOD FOR SHAPE PRESERVATION OF CURVES IN AN EDITING PROCESS

TECHNICAL FIELD OF THE INVENTION

The present invention is directed, in general, graphical editing techniques.

BACKGROUND OF THE INVENTION

In the area of computer graphics and in particular in the area of b-spline or NURBS curve editing and manipulation, it is typical for graphical curves, after they have been drafted, to be edited by users. Conventionally, there are two major approaches to editing curves in existing solutions.

The first conventional approach is to directly edit the curve data, i.e., either edit points of the curve or the control vertices of the control polygon.

In this method the user directly selects an edit point for example and moves it to a new location. The other points on the curve remain fixed and the curve re-interpolates through the new location. Because the other edit points do not know how to react intelligently to this edit, the curve shape is often distorted, requiring many more edits to re-achieve a pleasing shape.

The second conventional approach entails an edit using a special command. In this method, the user chooses a special command for editing the curves, where the special command contains some intelligence on how to edit the points as a set. For example, a user might choose a scale command and scale the curve in X, but not in Y and Z. This keeps the general curve shape, but has several significant downsides. The most important downside is that by making this command-based, the element is not able to react appropriately if it is asked to edit outside the context of this command. For example, in current associative (or history-based) systems, a change to another curve might require this curve to change to stay connected. Because the intelligence for a "shape-preserving" modification is not maintained within the curve, it cannot react appropriately, and instead edits in a "local" manner as described in the first conventional technique above.

Some commercial software tools with curve-editing capabilities take a "global" approach to curve editing, where by default the curve scales rather than deforming. That is, when a scaling handle of the curve graphic is dragged in a specific direction, the curve will scale in the x-dimension, the y-dimension, or both, while maintaining a basic form of its original shape. This crude "shape preservation" method has specific limitations, however.

One limitation of this technique is that the curve editing is indirect, in that scaling can only be done by manipulating a global scaling handle point. The user is unable to modify a point on the curve specifically and have the rest of the curve update globally.

Further, this type of curve editing is limited to single edits; the user is unable to edit multiple points on the curve in multiple different directions and have the curve respond appropriately.

Finally, this conventional graphical edit cannot be triggered by an outside event, such as another object being modified; it must be manually performed by the user.

There is, therefore, a need in the art for an improved system, method, and computer program product for intelligently preserving shape properties of a curve when being manually or automatically edited.

SUMMARY OF THE INVENTION

To address the above-discussed deficiencies of the prior art, it is a primary object of the present invention to provide an improved graphical editing technique.

The preferred embodiment provides a system, method, and computer program product which allows more versatile manual and automatic edits by embedding behaviors in the curve elements. These imbedded behaviors allow intelligent shape preservation during a curve edit. Each curve carries a behavior property that describes how it should react when edited. This means that the curve and graphics system have full knowledge of the right edit type to make, even when triggered by an outside source, such as a re-compute of an object at a higher level in the feature tree.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
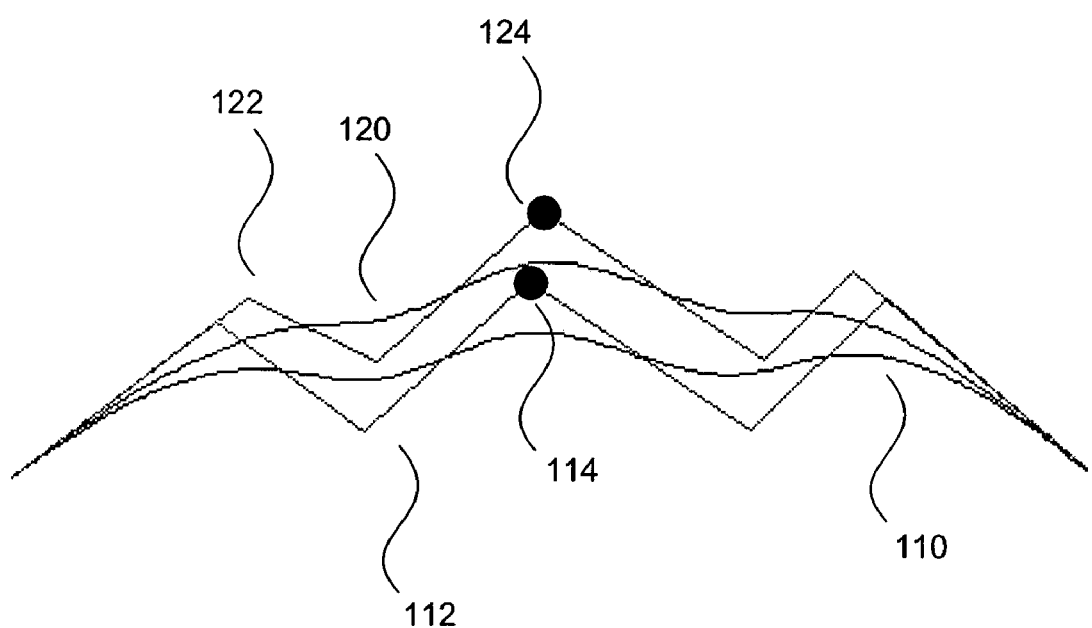
FIG. 1 depicts exemplary curves in accordance with a preferred embodiment of the present invention.
Figure 2:
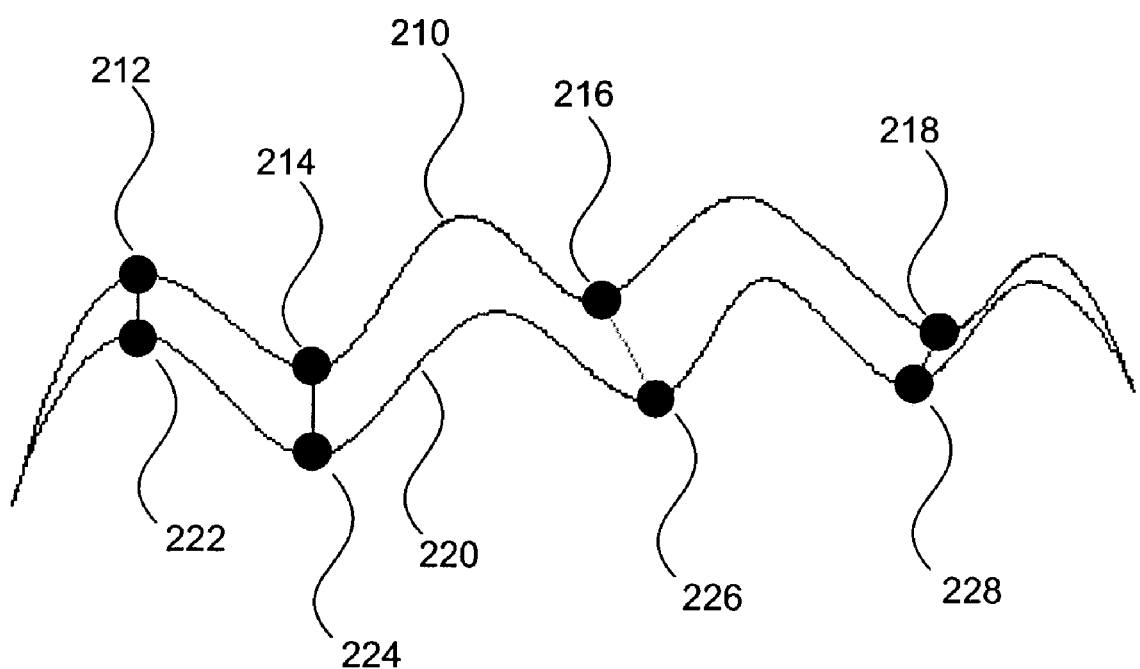
FIG. 2 depicts exemplary curves in accordance with a preferred embodiment of the present invention.
Figure 3:
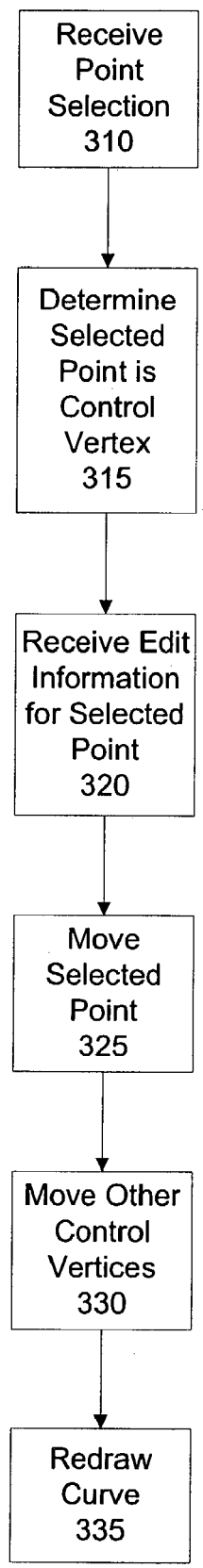
FIG. 3 depicts a flowchart of a process in accordance with a preferred embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

Definitions: Following are short definitions of the usual meanings of some of the technical terms which are used in the present application. (However, those of ordinary skill will recognize whether the context requires a different meaning.) Additional definitions can be found in the standard technical dictionaries and journals.

B-spline curve—A free-form, parametrically defined curve in which each vertex has an influence over a defined range of the curve.

NURBS curve—Non-uniform, rational, b-spline curve. A b-spline curve where the parameterization may be non-uniform and the weighting at the control vertices may be uneven (or rational).

Control Vertex—One of a set of points which define the vertices of the control polygon of the curve.

B-spline surface—A free-form, parametrically defined surface in which each vertex has an influence over a defined range of the surface.

Iso-parametric curve—A B-spline curve obtained by tracing on a B-spline surface along the entire domain of one of the (u, v) parameters, with the value of the other parameter kept constant. Iso-parametric curves obtained by keeping the u parameter constant are referred to as "constant-u iso-parametric curves". Similarly for "constant-v iso-parametric curves".

Knots—A knot is a number which is part of the definition of a B-spline curve or surface and which is used to control its shape. The collection of all knots used by a B-spline is called a knot vector. The distance between knot values is called its knot spacing. Uniform B-splines set the knot spacing to 1 (usually), and non-uniform rational B-splines allow for uneven spacing of the knots.

Compatible in the B-spline sense—A set of B-spline curves are said to be compatible in the B-spline sense if they have the same degree and knot sequence.

Further, in this document, it is assumed that the reader is of skill in the art, and is familiar with common terms and acronyms as used in the art. In particular, it is noted that a feature tree contains sequential lists of features, states, or events relating to a graphical element or elements. As used in this document, "upstream" refers to features, states, or events which have a chronologically earlier position in the feature tree, and "downstream" refers to features, states, or events which have a chronologically later position in the feature tree. Further, the "dependent tree" refers to the tree of features, states, or events which are downstream in the feature tree, as later events are naturally dependent on earlier events.

The preferred embodiment provides a system, method, and computer program product which allows more versatile manual and automatic edits by embedding behaviors in the curve elements. These imbedded behaviors allow intelligent shape preservation during a curve edit. Each curve carries a behavior property that describes how it should react when edited. This means that the curve and graphics system have full knowledge of the right edit type to make, even when triggered by an outside source, such as a re-compute of an object at a higher level in the feature tree.

This is a particular advantage in that the curve shape can be maintained even when the edit of one point initates a process that edits other downstream points automatically, all in a fashion that requires no user intervention.

Some additional features of the preferred embodiments are that they will adjust the end tangent magnitudes to prevent inflections from being introduced. Additionally, multiple points can be moved specified distances along different directions simultaneously and the shape properties (convex, concave, inflections) are preserved.

One process in accordance with the preferred embodiments is that of editing one of the control vertices of a curve. First, the selected vertex is moved, either manually or automatically, by the specified displacement. Next, the curve is recomputed by moving the other vertices by derived displacements according to a property of the curve. The direction of these derived displacements is the same as the given one. However, the magnitudes of these derived displacements, according to a preferred property of the curve, are proportional to the distance between each other vertex and the selected vertex, along the control polygon.

FIG. 1 shows an exemplary curve that has been edited according to the preferred embodiment. Here, initial curve 110 is shown along with edited curve 120. Initial control polygon 112 corresponds to initial curve 110 and has a control vertex 114. Edited control polygon 122 corresponds to edited curve 120 and has a control vertex 124. Note that the large dots are only shown here for clarity of description, and would not be shown in the preferred implementations.

In this example, initial curve 110 has been edited as described above by dragging control vertex 114 of control polygon 112 into a new position as indicated by control vertex 124. When it has been moved (and preferably as it is being moved), the edited curve 120 and edited control polygon 122 are redrawn, according to the process described above.

Note that the control polygon is not necessarily displayed when implemented, but can be shown to illustrate the principles of the preferred embodiments.

Another process in accordance with a preferred embodiment related to editing a point on the curve. In order to move the curve at the given point by a specified distance, the system will insert knots into the knot vector until multiplicity of the knot is equal to the degree of curve. This is to ensure one of the control vertices coincident with the selected curve point. The selected point can now be treated as a control vertex as in the process above. Accordingly, the curve can be moved precisely by the specified distance. Upon completion, the multiple knots are removed. Neither the insertion of the knots nor their removal is obvious to the user.

Yet another process in accordance with the preferred embodiments is that of editing multiple points in different directions by different distances. We again insert multiple knots into the knot vector so that we can control the distance by which the curve is moved and also shield one edit point from others while moving multiple points simultaneously.

FIG. 2 shows an exemplary curve that has been simultaneously edited at multiple points according to the process described above. Here, initial curve 210 is shown along with edited curve 220. Initial curve 210 is shown with control vertices 212/214/216/218. Edited curve 220 is shown with control vertices 222/224/226/228. Note that the control vertices are displayed as edit points, but are handled as control vertices by virtue of the multiple knot insertion techniques described herein. In this respect, control vertices and edit points are functionally equivalent, according to the preferred embodiment.

Note that the large dots are only shown here for clarity of description, and would not be shown in the preferred implementations.

In this example, initial curve 110 has been edited as described above by simultaneously dragging control vertex 212 into a new position as indicated by control vertex 222 (as shown by the line connecting these control vertices), control vertex 214 into a new position as indicated by control vertex 224 (as shown by the line connecting these control vertices), control vertex 216 into a new position as indicated by control vertex 226 (as shown by the line connecting these control vertices), and control vertex 218 into a new position as indicated by control vertex 228 (as shown by the line connecting these control vertices). Note that each control vertex is moved in a different direction and by a different distance. When they have been moved (and preferably as they are being moved), the edited curve 220 is drawn, according to the process described above.

Note that control polygon 112/122 is not necessarily displayed when implemented, but is shown here to illustrate the principles of the preferred embodiment. (there is no control polygon shown in the figure) Further, the lines shown connecting the control vertices in their original and edited position would not be displayed when implemented, but are shown here to illustrate the relative positions of each vertex.

It should be clear to those of skill in the art, then, that features of the above processes can be combined into a single process which would allow improved curve editing at one or more points simultaneously, where those points can occur anywhere along the curve. Further, this process can be initiated by a manual action by a user or by an automated system process.

FIG. 3 shows a flowchart of such a combined process, in accordance with a preferred embodiment of the present invention. It should be noted that those of skill in the art will recognize whether selected steps must be performed in the order recited or can be performed at other times.

Here, the system first receives the selection of one or more points on the curve to be edited (step 310). The description below will be in reference to a single point; if multiple points are selected, then the steps are preferably performed simultaneously for each selected point. Note also that the point and the edit may be manually performed by a user, or may be part of an automatic process, particularly a process involving an update after an upstream event has been edited.

The system will then ensure that the selected point is a control vertex (step 315). If it is not, then knots are added until the point can be defines as a control vertex, as described above.

The system receives the edit information for the selected point (step 320). The selected point is moved as required (step 325). The other vertices of the curve are then moved in the same direction that the selected point was moved (step 330). The other vertices are moved a distance in that direction that is proportional to each point's distance from the selected point along the control polygon.

If multiple points are being simultaneously edited, each is moved as described above, and each vertex is also moved accordingly, so each vertex may be subject to several different moves in different directions. In this case, each vertex is moved as described in the example below.

For a multiple-vertex edit, the process loops over each vertex, holding part of the curve invariant. Suppose that there are 3 points to move in 3 directions, numbered 1, 2, and 3 from left to right. The process inserts multiple knots at 2 so that the curve to the RIGHT of 2 won't change. Then the process moves 1 to where it is supposed to go. Then, the process inserts multiple knots at 1 so that the entire portion of the curve to the LEFT of 1 won't move.

Next, the process executes move 2 (so far point 1 and point 2 are in the correct locations). Then, it inserts multiple knots at point 2 so that everything to the LEFT of point 2 won't move and then it moves point 3. Finally, the process deletes all the multiknots inserted for the move.

Finally, the curve is redrawn according to the new control vertices and the control polygon (step 335).

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of data processing system may conform to any of the various current implementations and practices known in the art.

It is important to note that while the present invention has been described in the context of a fully functional system, those skilled in the art will appreciate that at least portions of the mechanism of the present invention are capable of being distributed in the form of instructions contained within a machine usable medium in any of a variety of forms, and that the present invention applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and transmission type mediums such as digital and analog communication links.

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A method for editing a curve, comprising:
   receiving a selected point on a curve to be edited;
   receiving edit information for the selected point, the edit information including distance and direction information;
   if the selected point is not a control vertex of the curve, inserting knots into the curve until the selected point is defined as a control vertex of the curve;
   moving the selected point in an edit direction and to an edit distance according to the edit information;

moving at least one secondary point in the edit direction and to a distance corresponding to a property of the curve to be edited; and drawing an edited curve according to the selected point and the secondary point.

2. The method of claim 1, wherein the selected point and the secondary point are both control vertices of the curve.

3. The method of claim 1, wherein multiple points can be simultaneously moved in different edit directions while preserving at least one shape property of the curve.

4. The method of claim 1, wherein multiple points are simultaneously edited.

5. The method of claim 1, wherein the curve is redrawn also in accordance with a control polygon.

6. The method of claim 1, wherein the selected point and edit information are received from a user.

7. The method of claim 1, wherein the selected point and edit information are received from an automated curve update process.

8. A data processing system having at least a processor and accessible memory, comprising:
means for receiving a selected point on a curve to be edited;
means for receiving edit information for the selected point, the edit information including distance and direction information;
means for, if the selected point is not a control vertex of the curve, inserting knots into the curve until the selected point is defined as a control vertex of the curve;
means for moving the selected point in an edit direction and to an edit distance according to the edit information; and
means for moving at least one secondary point in the edit direction and to a distance corresponding to a property of the curve to be edited; and
means for drawing an edited curve according to the selected point and the secondary point.

9. The data processing system of claim 8, wherein the selected point and the secondary point are both control vertices of the curve.

10. The data processing system of claim 8, wherein multiple points can be simultaneously moved in different edit directions while preserving at least one shape property of the curve.

11. The data processing system of claim 8, wherein multiple points are simultaneously edited.

12. The data processing system of claim 8, wherein the curve is redrawn also in accordance with a control polygon.

13. The data processing system of claim 8, wherein the selected point and edit information are received from a user.

14. The data processing system of claim 8, wherein the selected point and edit information are received from an automated curve update process.

15. A computer program product tangibly embodied in a computer-readable medium, comprising:
instructions for receiving a selected point on a curve to be edited;
instructions for receiving edit information for the selected point, the edit information including distance and direction information;
instructions for, if the selected point is not a control vertex of the curve, inserting knots into the curve until the selected point is defined as a control vertex of the curve;
instructions for moving the selected point in an edit direction and to an edit distance according to the edit information; and
instructions for moving at least one secondary point in the edit direction and to a distance corresponding to a property of the curve to be edited; and
instructions for drawing an edited curve according to the selected point and the secondary point.

16. The computer program product of claim 15, wherein the selected point and the secondary point are both control vertices of the curve.

17. The computer program product of claim 15, wherein multiple points can be simultaneously moved in different edit directions while preserving at least one shape property of the curve.

18. The computer program product of claim 15, wherein multiple points are simultaneously edited.

19. The computer program product of claim 15, wherein the curve is redrawn also in accordance with a control polygon.

20. The computer program product of claim 15, wherein the selected point and edit information are received from a user.

21. The computer program product of claim 15, wherein the selected point and edit information are received from an automated curve update process.

* * * * *